United States Patent [19]

Wood

[11] Patent Number: 5,263,431
[45] Date of Patent: Nov. 23, 1993

[54] COMBINATION WINCH AND STOWAGE REEL ASSEMBLY FOR ARRAYS TOWED BY SUBMARINES

[75] Inventor: Edwin H. Wood, North Franklin, Conn.

[73] Assignee: The United States of America as represented by the Secretary of the Navy, Washington, D.C.

[21] Appl. No.: 888,997

[22] Filed: May 26, 1992

[51] Int. Cl.⁵ .............................................. B63B 21/66
[52] U.S. Cl. ............................... 114/254; 74/DIG. 10; 191/12.2 A; 242/54 R; 114/244
[58] Field of Search ............... 114/254, 244, 312; 242/54 R, 56.9; 74/DIG. 10, 460; 191/12.2 A, 12.2 R

[56] References Cited

U.S. PATENT DOCUMENTS

| | | | |
|---|---|---|---|
| 561,172 | 6/1896 | Newell | 114/254 |
| 1,867,141 | 7/1932 | Farnham | 191/12.2 A |
| 1,976,516 | 10/1934 | Renshaw et al. | 191/12.2 A |
| 2,443,763 | 6/1948 | Dahlgren et al. | 191/12.2 A |
| 2,720,119 | 10/1955 | Sherman | 74/460 |
| 3,034,471 | 5/1962 | Aschinger | 114/254 |
| 3,172,510 | 3/1965 | Lee et al. | 191/12.2 A |
| 3,180,171 | 4/1965 | Arpin | 74/460 |
| 4,047,599 | 9/1977 | Rousseau | 191/12.2 A |
| 4,489,308 | 12/1984 | Logan et al. | 191/12.2 A |
| 5,119,751 | 6/1992 | Wood | 114/254 |

Primary Examiner—F. J. Bartuska
Assistant Examiner—Thomas J. Brahan
Attorney, Agent, or Firm—Michael J. McGowan; Prithvi C. Lall; Michael F. Oglo

[57] ABSTRACT

A combination winch and stowage reel assembly for arrays towed by submarines, the assembly comprising a hub, a slip ring mounted in the hub and in communication with a receiver in the submarine, a reel rotatably mounted on the hub, the reel having gear teeth on a periphery thereof, a tow cable fixed to the reel and adapted to have attached to a free end thereof an array to be towed behind the submarine, the tow cable being in communication with the slip ring to form a communication path including the array, the tow cable, the slip ring and the receiver, a drive gear engaged with the reel gear teeth, and a motor for turning the drive gear, thereby to turn the reel on the hub to pay out and take up the cable.

5 Claims, 4 Drawing Sheets

COMBINATION WINCH AND STOWAGE REEL ASSEMBLY FOR ARRAYS TOWED BY SUBMARINES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to an assembly for paying out and reeling in and stowing cable and the like, and is directed more particularly to such an assembly as is suitable for use onboard submarines in conjunction with towed acoustical sensing arrays.

(2) Description of the Prior Art

Referring to FIGS. 1 and 2, it will be seen that the prior art winch and stowage reel assembly includes a winch assembly W and a stowage reel assembly R. The winch assembly W includes a driven capstan C and an idling drum D. In operation, the capstan C rotates to bring a tow cable T onto the capstan C and thence onto the drum D and back to the capstan, usually for a plurality of turns, and thence onto the stowage reel R. To pay out the tow cable T, which typically would have an array fixed to a free end thereof, the array being of substantially the same configuration as the cable. The capstan C draws cable from the stowage reel R and, after a plurality of turns around the idling drum D, urges the cable through a guide tube G and out of the submarine to facilitate towing of the array well aft of the submarine's propulsion propellers. The capstan is driven at its central hub. In paying out the cable there initially may be little stress on the cable so that the capstan may turn within the cable wound thereon without causing the cable to pay out. Rollers are provided (not shown) which press the cable wound upon the capstan against the capstan hub to generate a frictional interface so that turning of the capstan hub will generate movement of the cable. In short order, enough cable is payed out such that the drag of the array and cable through the water produces strain on the cable sufficient to cause the cable to move in accordance with the bidding of the capstan.

It is clear from FIGS. 1 and 2, that the prior art assembly requires a relatively large space on a vessel in which space is at a premium. It would be beneficial to have available for use in submarines a winch and stowage reel assembly requiring less space.

SUMMARY OF THE INVENTION

It is therefore an object of the present invention to provide a combination winch and stowage reel assembly requiring substantially less space than the prior art assembly.

A further object of the invention is to provide such an assembly adapted to handle, optionally, more than a single tow cable and to handle such cables simultaneously or independently, as desired.

With the above and other objects in view, as will hereinafter appear, a feature of the present invention is the provision of a combination winch and stowage reel assembly for arrays towed by submarines, the assembly comprising a tubular hub fixed to the submarine, a slip ring mounted in the hub, the slip ring having a stationary first portion and a second portion rotatably mounted on the first portion, the first portion being in communication with a receiving station in the submarine and in communication with the second portion, a first reel rotatably mounted on the hub, the reel having an annular bottom wall concentric with the hub, and first and second walls extending radially from the bottom wall and parallel to each other, the first wall having gear teeth on a periphery thereof, a first tow cable fixed to the reel and adapted to be wound upon the reel bottom wall between the first and second walls, the tow cable being adapted to have attached to a free end thereof an array to be towed behind the submarine, the tow cable being in communication with the slip ring second portion, thereby to form a communication path including the array, the tow cable, the slip ring and the receiver, a drive gear engaged with the first wall gear teeth, and a motor for turning the drive gear, thereby to turn the first wall, and thereby to turn the reel on the hub to pay out the tow cable from the reel and to take up the tow cable onto the reel.

In accordance with a further feature of the invention, there is provided in combination with the above-described feature, a collar portion rotatably mounted on the slip ring first portion and in communication therewith, a second reel rotatably mounted on the hub, the second reel having an annular bottom wall concentric with the hub, and first and second walls extending radially from the second reel bottom wall and parallel to each other, the second reel first wall having gear teeth on a periphery thereof, a second tow cable fixed to the second reel and adapted to be wound upon the second reel bottom wall between the second reel first and second walls, the second tow cable being adapted to have attached to a free end thereof a second array to be towed behind the submarine, the second tow cable being in communication with the slip ring collar portion, thereby to form a communication path including the second array, the second tow cable, the slip ring and the receiver, a second drive gear engaged with the second reel first wall gear teeth, and a second motor for turning the second drive gear, thereby to turn the second reel first wall, and thereby to turn the second reel on the hub to pay out the second tow cable from the second reel and to take up the second tow cable onto the second reel.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

DESCRIPTION OF THE PREFERRED EMBODIMENT

Figure 3:
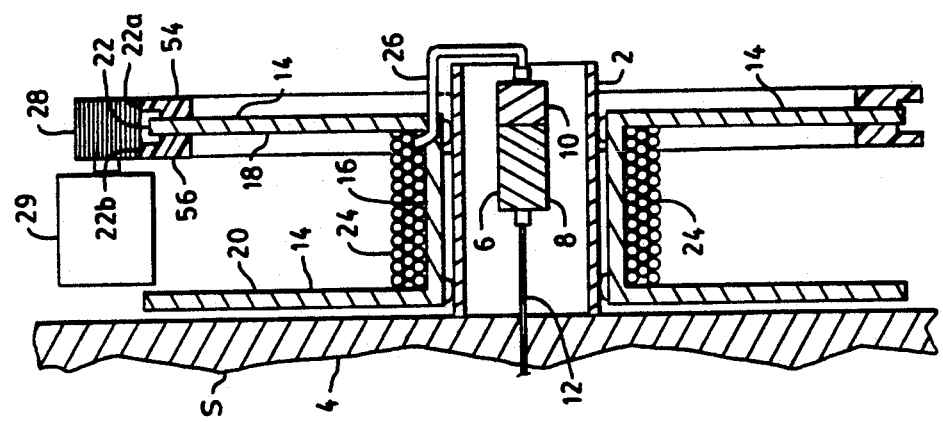
FIG. 3 is a partly diagrammatic sectional view of a combination winch and stowage reel assembly illustrative of an embodiment of the invention.

Referring to FIG. 3, it will be seen that the assembly includes a rigid tubular hub 2 fixed to a portion 4 of a submarine S. A slip ring 6 is provided with a stationary first portion 8 and a second portion 10 rotatably mounted on the first portion 8. A slip ring cable 12 extends from the slip ring stationary first portion 8 to a receiver (not shown) within the submarine S. The receiver may be headphones, a computer, or a visual read-out means, or a combination thereof. The first and second portions 8, 10 are in electronic communication such that an electronic signal received by the rotating second slip ring portion 10 is passed on to the stationary slip ring portion 8, and thence through the slip ring cable 12 to the receiver.

A first stowage reel 14 is mounted on the hub 2 and adapted to rotate thereon. The reel 14 is provided with an annular bottom wall 16 concentric with the hub 2 and first and second walls 18, 20 extending radially outwardly from the bottom wall 16 and parallel to each other. The first wall 18 has gear teeth 22 on a periphery thereof.

A first tow cable 24 is fixed at one end to the reel 14 and adapted to be wound upon the reel bottom wall 16 between the first and second walls 18, 20.

The tow cable 24 is adapted to have fixed to a free end thereof an acoustical array (not shown) which typically is of the same configuration and same size diameter as the tow cable. Thus, the array itself is adapted to be wound upon the reel 14 in the same manner as the tow cable 24, with the array being received by the reel as an extension of the tow cable.

A pendant cable 26 interconnects the anchored end of the tow cable 24 and the slip ring rotatable second portion 10. Thus, there is formed a communication path extending from the acoustical array, which is adapted to detect noises in the water, to the tow cable 24, the slip ring 6, and the receiver.

A first drive gear 28 is engaged with the first wheel gear teeth 22, and a motor 29 is provided for turning the drive gear 28. Turning the drive gear 28 causes turning of the first wall 18 and thereby turning of the first stowage reel 14 to selectively pay out or take up the tow cable 24.

Thus, there is a provided a rotatable reel which functions as both a winch and a stowage reel.

Figure 1:
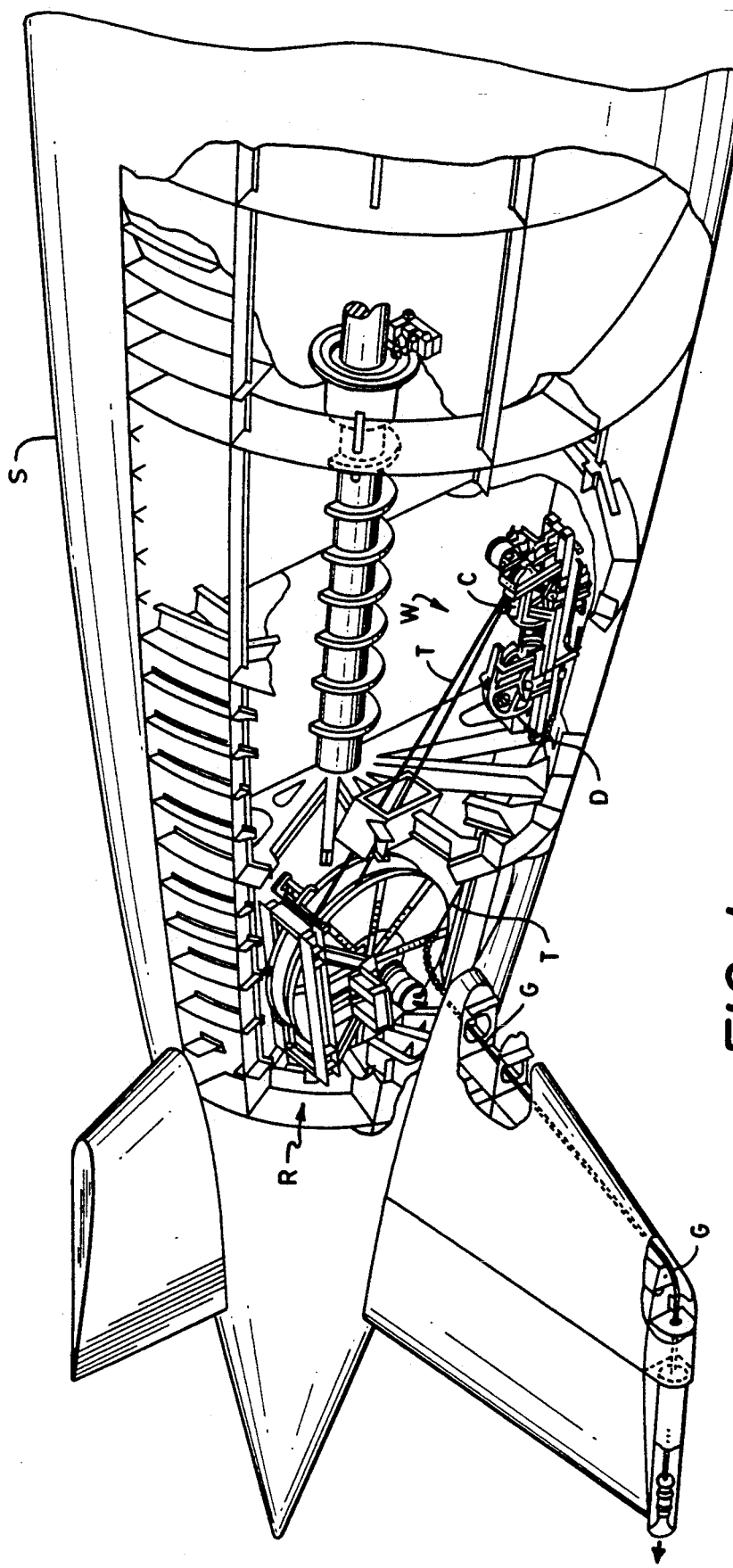
FIG. 1 is a perspective view of a prior art assembly, showing the disposition of a winch portion and a stowage reel portion of the assembly in a submarine
Figure 2:
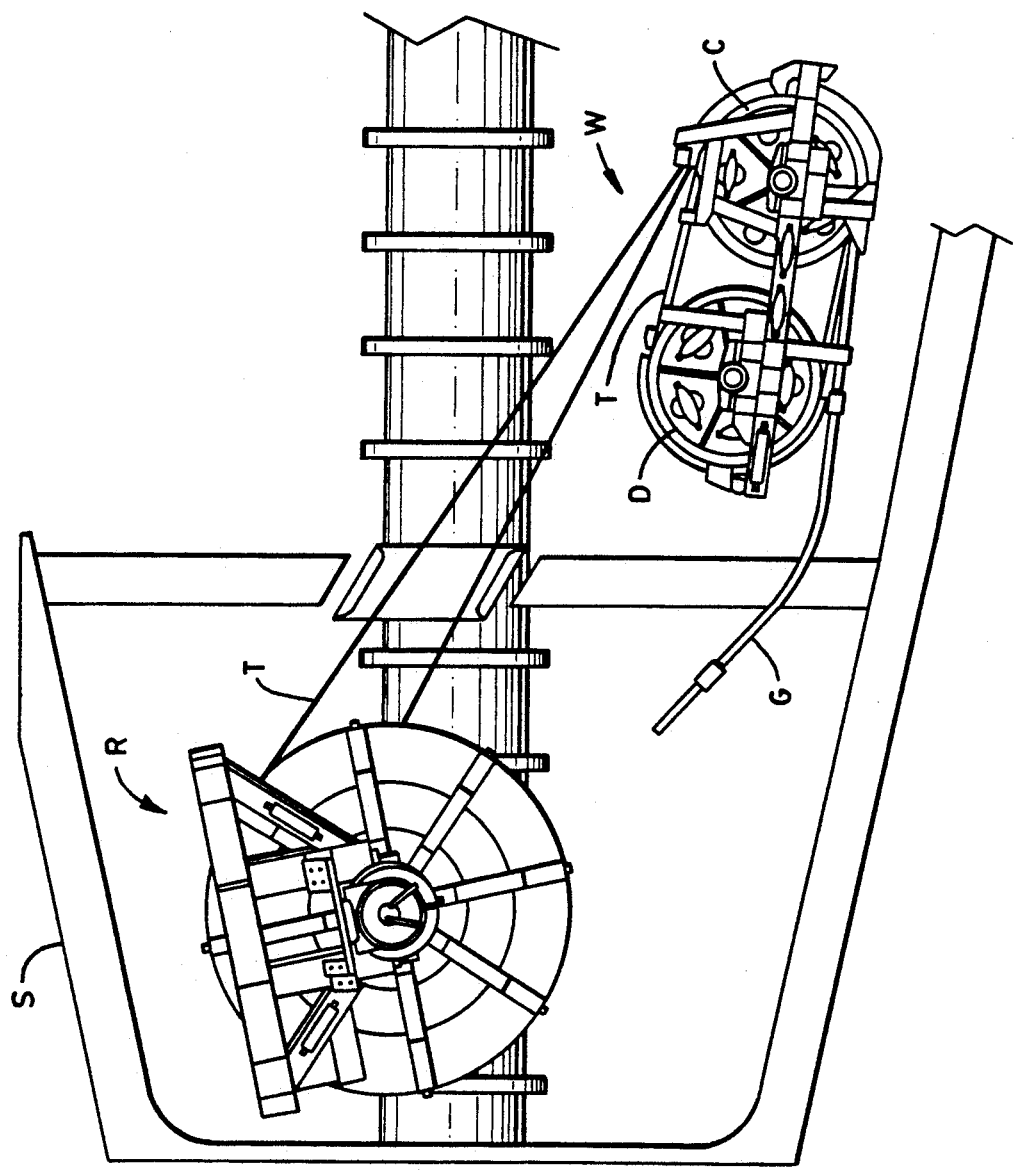
FIG. 2 is a side elevational view of the prior art assembly shown in FIG. 1.
Figure 5:
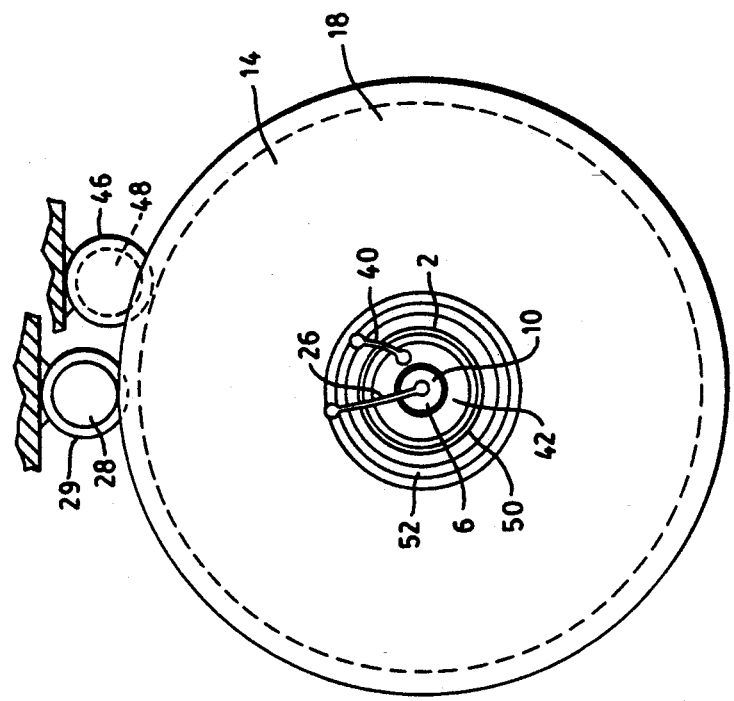
FIG. 5 is a side elevational view of the embodiment of FIG. 4.
Figure 4:
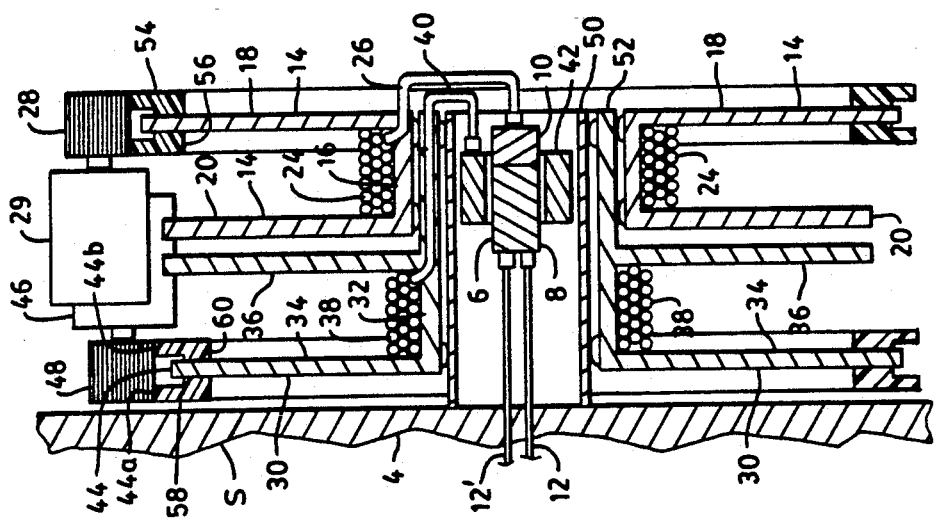
FIG. 4 is a partly diagrammatic sectional view of another combination winch and stowage reel assembly illustrative of an alternative embodiment of the invention.

Referring to FIGS. 4 and 5, it Will be seen that the assembly may include a second stowage reel 30 rotatable about the hub 2, the reel 30 having an annular bottom wall 32, and first and second side walls 34, 36 extending radially from the bottom wall 32, all as previously described relative to the first stowage reel 14.

A second tow cable 38 is fixed at one end to the second stowage reel and is adapted to be wound upon the second reel bottom wall 32 between the two side walls 34, 36. As in the case of the first tow cable 24, the second tow cable is adapted to have fixed to a free end thereof a second array. The second tow cable is connected by a second pendant cable 40 to a slip ring collar portion 42 which is rotatable about, and in electronic communication with, the stationary slip ring first portion 8. There is thus established a communication path from the second array to the second tow cable 38 and thence to the slip ring 6 and a second slip ring cable 12' to the receiver.

The first side wall 34 of the second stowage reel 30 is provided with gear teeth 44. A second motor 46 is drivingly connected to a second drive gear 48 engageable with the second stowage reel first wall gear teeth 44. Turning the drive gear 48 causes turning of the second reel first side wall 34 and thereby turning of the second stowage reel 30 to selectively pay out or take up the second tow cable 38.

Referring to FIG. 4, it will be seen that the second stowage reel bottom wall 32 extends radially and concentrically of the hub 2 beyond the second reel walls 34, 36 and substantially to a free end 50 of the hub 2. The first stowage reel 14 in the embodiment shown in FIG. 4 is rotatably mounted on the extension 52 of the hub which, in turn, is rotatably mounted on the hub 2.

Referring to FIGS. 3 and 4, it will be seen that the gear teeth 22, 44 of the respective first side walls 18, 34 are formed in the first side wall, which is of metal. Additionally, the first wall gear teeth are formed in annular rings 54, 56, 58, 60 of plastic material fixed to the metal first walls and having gear teeth formed therein. The drive gears 28, 48 comprise pinions which ar provided with teeth which extend through their respective plastic rings and metal wall.

The gear teeth 22 in the first metal wall are formed so as not to be engaged with the teeth of the pinion 28. The plastic rings 54, 56 fixed to the first metal wall are provided with teeth 22a, 22b, which are closely toleranced with respect to the teeth of the pinion 28.

Similarly, the gear teeth 44 in the second metal wall are formed with a "loose" tolerance relative to the pinion 48, such that the gear teeth 44 are not normally engaged with the teeth of the pinion 48. The plastic rings 58, 60, however, are closely toleranced with respect to the teeth of the pinion 48.

When the motor 29 drives the pinion 28, the teeth of the pinion 28 engage the teeth 22a, 22b of the plastic rings 54, 56 and cause the first stowage reel 14 to turn, to pay out or take in the cable 24. In the embodiment shown in FIG. 4, when the motor 46 drives the pinion 48, the teeth of the pinion 48 engage teeth 44a, 44b of the plastic rings 58, 60 and cause the second stowage reel 30 to turn, to pay out or take in the cable 38.

In the event of an overload situation arising, deformation of the plastic teeth 22a, 22b, 44a, 44b on the annular rings 54, 56, 58, 60 permits engagement of the metal teeth 22, 44 of the first walls 18, 36 by the pinion teeth to ensure positive driving of the stowage reels 14, 30.

When the array, or arrays, are payed out and are towed behind the submarine, the arrays are sensitive to acoustical data and adapted to transmit such data through the respective communication paths, above described, to an on-board receiver wherein the acoustics may be analyzed and identified.

Figure 6:
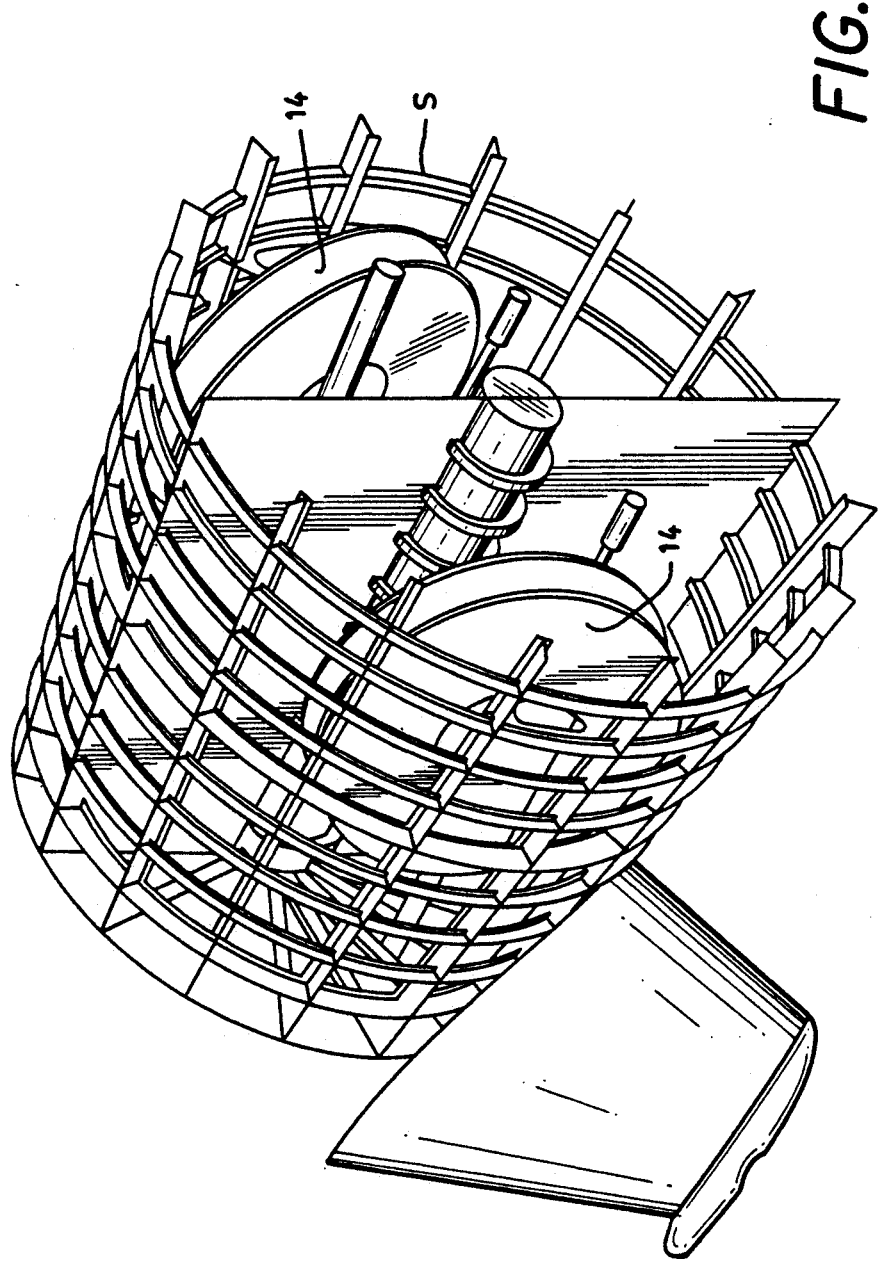
FIG. 6 is a diagrammatic perspective view showing placement of the combination winch and stowage reel assembly in a submarine.

In FIG. 6, there is shown diagrammatically the manner in which the combination winch and stowage reel assembly may be disposed in a submarine structure S, making apparent the substantial savings inspace realized by the apparatus described herein which, at the same time, provides increased flexibility in usage.

It will be apparent that the embodiment of FIGS. 4 and 5 may be used to provide a selection of different types of arrays, or may be used to provide facility for towing a plurality of arrays simultaneously. While embodiments featuring one and two stowage reels have been illustrated, one may readily adapt the invention to more than two reels.

It is to be understood that the present invention is by no means limited to the particular embodiment herein disclosed and/or shown in the drawings, but also comprises any modifications or equivalents within the scope of the claims.

Having thus described my invention, what I claim as new and desire to secure by Letters Patent of the United States is:

1. A combination winch and stowage reel assembly for arrays towed by submarines, said assembly comprising a tubular hub fixed to said submarine, a slip ring mounted in said hub, said slip ring having a stationary first portion and a second portion rotatably mounted on said first portion, said first portion being in communication with a receiving station in said submarine and in communication with said second portion, a first reel rotatably mounted on said hub, said reel having an annular bottom wall concentric with said hub, and first and second walls extending radially from said bottom wall and parallel to each other, said first wall having gear teeth on a periphery thereof, a first two cable fixed to said reel and adapted to be wound upon said reel bottom wall between said first and second walls, said tow cable being adapted to have attached to a free end thereof an array to be towed behind said submarine, said tow cable being in communication with said slip ring second portion, thereby to form a communication path including said array, said tow cable, said slip ring and said receiver, a drive gear engaged with said first wall gear teeth, and a motor for turning said drive gear, thereby to turn said first wall, and thereby to turn said reel on said hub to pay out said tow cable from said reel and to take up said tow cable onto said reel, a collar portion rotatably mounted on said slip ring first portion and in communication therewith, a second reel rotatably mounted on said hub, said second reel having an annular bottom wall concentric with said hub and first and second walls extending radially from said second reel bottom wall and parallel to each other, said second reel first wall having tear teeth on a periphery thereof, a second tow cable fixed to said second reel and adapted to be wound upon said second reel bottom wall between said second reel first and second walls, said second tow cable being adapted to have attached to a free end thereof a second array to be towed behind said submarine, said second tow cable being in communication with said slip ring collar portion, thereby to form a communication path including said second array, said second tow cable, said collar portion, said slip ring and said receiver, a second drive gear engaged with said second reel first wall gear teeth, and a second motor for turning said second drive gear, thereby to turn said second reel first wall, and thereby to turn said second reel on said hub to pay out said second tow cable from said second reel and to take up said second tow cable onto said second reel.

2. The combination winch and stowage reel assembly in accordance with claim 1 wherein said second reel bottom wall extends axially and concentrically of said hub beyond said second reel walls and substantially to a free end of said hub, said first reel being rotatably mounted on said second reel bottom wall extension.

3. The combination winch and stowage reel assembly in accordance with claim 1 and including a first pendant cable interconnecting said first tow cable and said slip ring second portion, thereby providing said communication between said first tow cable and said slip ring second portion.

4. The combination winch and stowage reel assembly in accordance with claim 1 and including a first pendant cable interconnecting said first tow cable and said slip ring second portion, thereby providing said communication between said first tow cable and said slip ring second portion, and a second pendant cable interconnecting said second tow cable and said slip ring collar portion, thereby providing said communication between said second tow cable and said slip ring collar portion.

5. A combination winch and stowage reel assembly for arrays towed by submarines, said assembly comprising a tubular hub fixed to said submarine, a slip ring mounted in said hub, said slip ring having a stationary first portion and a second portion rotatably mounted on said first portion, said first portion being in communication with a receiving station in said submarine and in communication with said second portion, a first reel rotatably mounted on said hub, said reel having an annular bottom wall concentric with said hub, and first and second walls extending radially from said bottom wall and parallel to each other, said first wall having gear teeth on a periphery thereof, a first tow cable fixed to said reel and adapted to be wound upon said reel bottom wall between said first and second walls, said tow cable being adapted to have attached to a free end thereof an array to be towed behind said submarine, said two cable being in communication with said slip ring second portion, thereby to form a communication path including said array, said tow cable, said slip ring and said receiver, a drive gear engaged with said first wall gear teeth, and a motor for turning said drive gear, thereby to turn said first wall, and thereby to turn said reel on said hub to pay out said tow cable from said reel and to take up said tow cable onto said reel, wherein said first wall is made of a metal and has gear teeth formed in said periphery thereof and further comprising annular ring means of a plastic material fixed to at least one of said first and second walls, said ring means having gear teeth formed therein, and wherein said drive gear comprises a pinion having teeth engaged with said plastic ring means gear teeth and furthermore where said gear teeth of said pinion are adapted to engage said metal wall gear teeth only upon deformation of said plastic annular ring means gear teeth and wherein said plastic annular ring means comprises first and second annular rings, one on each side of said metal wall, said pinion gear teeth being engaged with said first and second annular ring gear teeth.

* * * * *